United States Patent
Harp et al.

(10) Patent No.: US 11,420,659 B2
(45) Date of Patent: Aug. 23, 2022

(54) TRAFFIC CONTROL SYSTEM AND METHOD FOR PROVIDING A PREEMPTION SIGNAL

(71) Applicant: Siemens Mobility, Inc., New York, NY (US)

(72) Inventors: Brian Harp, New Albany, IN (US); Holger Schmidt, Saint Johns, FL (US)

(73) Assignee: Siemens Mobility, Inc., New York, NY (US)

( * ) Notice: Subject to any disclaimer, the term of this patent is extended or adjusted under 35 U.S.C. 154(b) by 457 days.

(21) Appl. No.: 16/343,588

(22) PCT Filed: Nov. 15, 2016

(86) PCT No.: PCT/US2016/061995
§ 371 (c)(1),
(2) Date: Apr. 19, 2019

(87) PCT Pub. No.: WO2018/093349
PCT Pub. Date: May 24, 2018

(65) Prior Publication Data
US 2020/0047783 A1    Feb. 13, 2020

(51) Int. Cl.
*B61L 5/12*    (2006.01)
*B61L 1/02*    (2006.01)
(Continued)

(52) U.S. Cl.
CPC ............... *B61L 5/12* (2013.01); *B61L 1/02* (2013.01); *B61L 25/021* (2013.01); *G08G 1/087* (2013.01); *H04L 67/12* (2013.01); *H04L 69/324* (2013.01)

(58) Field of Classification Search
CPC .. B61L 5/12; B61L 1/02; B61L 25/021; B61L 29/00; B61L 29/22; B61L 29/28;
(Continued)

(56) References Cited

U.S. PATENT DOCUMENTS

| | | | |
|---|---|---|---|
| 2012/0138752 A1* | 6/2012 | Carlson | B61L 29/222 246/126 |
| 2012/0286103 A1* | 11/2012 | Hilleary | B61L 29/30 342/173 |

(Continued)

OTHER PUBLICATIONS

Gerhard Grundnig et al: "Wheel detection and axle counting as key elements of level crossing protection systems", Signal + Draht, DVV, vol. 105, No. 12, Dec. 1, 2013 (Dec. 1, 2013), pp. 30-35, XP001585615 / Dec. 1, 2013.
(Continued)

*Primary Examiner* — Hai Phan
*Assistant Examiner* — Anthony D Afrifa-Kyei

(57) ABSTRACT

A traffic control system (100) includes a railroad crossing control system (10) with a constant warning time device (40), a wheel sensing system (120) with a sensor (122) connected to a rail (20a, 20b) of a railroad track (20) at a predetermined position (P), and a communication network (140) interfacing with the railroad crossing control system (10) and the wheel sensing system (120) and adapted to transmit data. The wheel sensing system (120) provides speed values of a rail vehicle travelling on the railroad track (20), wherein the speed values are transmitted to the railroad crossing control system (10) via the communication network (140) for producing a preemption signal for the traffic signal control system (110). Further, a method for providing a preemption signal for a traffic signal control system (110) is described.

13 Claims, 5 Drawing Sheets

(51) Int. Cl.
*B61L 25/02* (2006.01)
*G08G 1/087* (2006.01)
*H04L 67/12* (2022.01)
*H04L 69/324* (2022.01)

(58) Field of Classification Search
CPC ...... B61L 29/30; B61L 29/282; B61L 29/284;
B61L 29/286; B61L 29/288; B61L 29/32;
G08G 1/087; G08G 7/02; G08G 7/00;
H04L 67/12; H04L 69/324
See application file for complete search history.

(56) References Cited

U.S. PATENT DOCUMENTS

2014/0350767 A1* 11/2014 Fries .................... B61L 25/021
701/119
2016/0189552 A1 6/2016 Hilleary

OTHER PUBLICATIONS

PCT International Search Report and Written Opinion of International Searching Authority dated Aug. 8, 2017 corresponding to PCT International Application No. PCT/US2016/061995 filed Nov. 15, 2016.

\* cited by examiner

US 11,420,659 B2

TRAFFIC CONTROL SYSTEM AND METHOD FOR PROVIDING A PREEMPTION SIGNAL

BACKGROUND

1. Field

Aspects of the present invention generally relate to a traffic control system, including for example railroad signal control equipment comprising a constant warning time device and traffic signal control equipment, and a method for providing a preemption signal to the traffic signal control equipment.

2. Description of the Related Art

Railroad signal control equipment includes for example a constant warning time device, also referred to as a grade crossing predictor (GCP) in the U.S. or a level crossing predictor in the U.K., which is an electronic device that is connected to the rails of a railroad track and is configured to detect the presence of an approaching train and determine its speed and distance from a crossing, i.e., a location at which the tracks cross a road, sidewalk or other surface used by moving objects. The constant warning time device will use this information to generate a constant warning time signal for controlling a crossing warning device. A crossing warning device is a device that warns of the approach of a train at a crossing, examples of which include crossing gate arms (e.g., the familiar black and white striped wooden arms often found at highway grade crossings to warn motorists of an approaching train), crossing lights (such as the red flashing lights often found at highway grade crossings in conjunction with the crossing gate arms discussed above), and/or crossing bells or other audio alarm devices. Constant warning time devices are typically configured to activate the crossing warning device(s) at a fixed time, also referred to as warning time (WT), which can be for example 30 seconds, prior to the approaching train arriving at a crossing.

Typical constant warning time devices include a transmitter that transmits a signal over a circuit formed by the track's rails and one or more termination shunts positioned at desired approach distances, also referred to as approach lengths, from the transmitter, a receiver that detects one or more resulting signal characteristics, and a logic circuit such as a microprocessor or hardwired logic that detects the presence of a train and determines its speed and distance from the crossing. The approach length depends on the maximum allowable speed (MAS) of a train, the desired WT, and a safety factor.

Where a signalized road intersection exists in close proximity to a railroad crossing, the railroad signal control equipment and the traffic signal control equipment are interconnected, and the normal operation of the traffic signals controlling the intersection are pre-empted to operate in a special control mode when trains are approaching. Preemption is the process of constant warning time devices feeding a "request to turn red" signal to road traffic light controllers of the traffic signal control equipment that allows vehicle traffic to approach railway crossings. When crossing lights and gates are activated, the city traffic lights on that same route also turn red, preferably before.

Federal Railroad Administration (FRA) and Department of Transport (DOT) safety incentives are requesting longer preemption warning times to turn traffic lights to red earlier for at least two reasons. First, longer preemption warning times allow longer vehicles, e.g. semi trailers, to clear the tracks before the crossing lights and gates are activated, and second, promote that vehicle traffic has stopped prior to lights and gate activation. Existing constant warning time devices are designed to provide a maximum WT, such as for example 30 seconds, to traffic light controllers. Increasing the existing WT will require a re-design and construction of all affected highway grade crossings and existing traffic control systems with no benefit to the railroads. Engineering, installation cost and maintenance are another costly concern.

SUMMARY

Briefly described, aspects of the present invention relate to a traffic control system, including for example railroad signal control equipment comprising a constant warning time device and highway and road traffic signal control equipment, and a method for providing a preemption signal to the road traffic signal control equipment.

A first aspect of the present invention provides a traffic control system comprising a railroad crossing control system comprising a constant warning time device with a control unit configured to produce multiple signals, a wheel sensing system comprising at least one sensor connected to a rail of a railroad track at a predetermined position, and a communication network interfacing with the railroad crossing control system and the wheel sensing system and adapted to transmit data, wherein the wheel sensing system provides speed values of a rail vehicle travelling on the railroad track, and wherein the speed values are transmitted to the railroad crossing control system via the communication network for producing a preemption signal for the traffic signal control system.

A second aspect of the present invention provides a method for providing a preemption signal to a traffic signal control system comprising installing a wheel sensing system comprising at least one sensor at a railroad track, the at least one sensor being connected to a rail of the railroad track, connecting the wheel sensing system to a constant warning time device of a railroad crossing control system by a communication network adapted to transmit data, obtaining speed values of a rail vehicle travelling on the railroad track by the wheel sensing system, transmitting the speed values obtained by the wheel sensing system to the constant warning time device via the communication network, and providing a preemption signal based on the speed values to a traffic signal control system by the constant warning time device.

DETAILED DESCRIPTION

To facilitate an understanding of embodiments, principles, and features of the present invention, they are explained hereinafter with reference to implementation in illustrative embodiments. In particular, they are described in the context of being traffic control systems, and a method for providing a preemption signal for a traffic controller of traffic signal control equipment. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
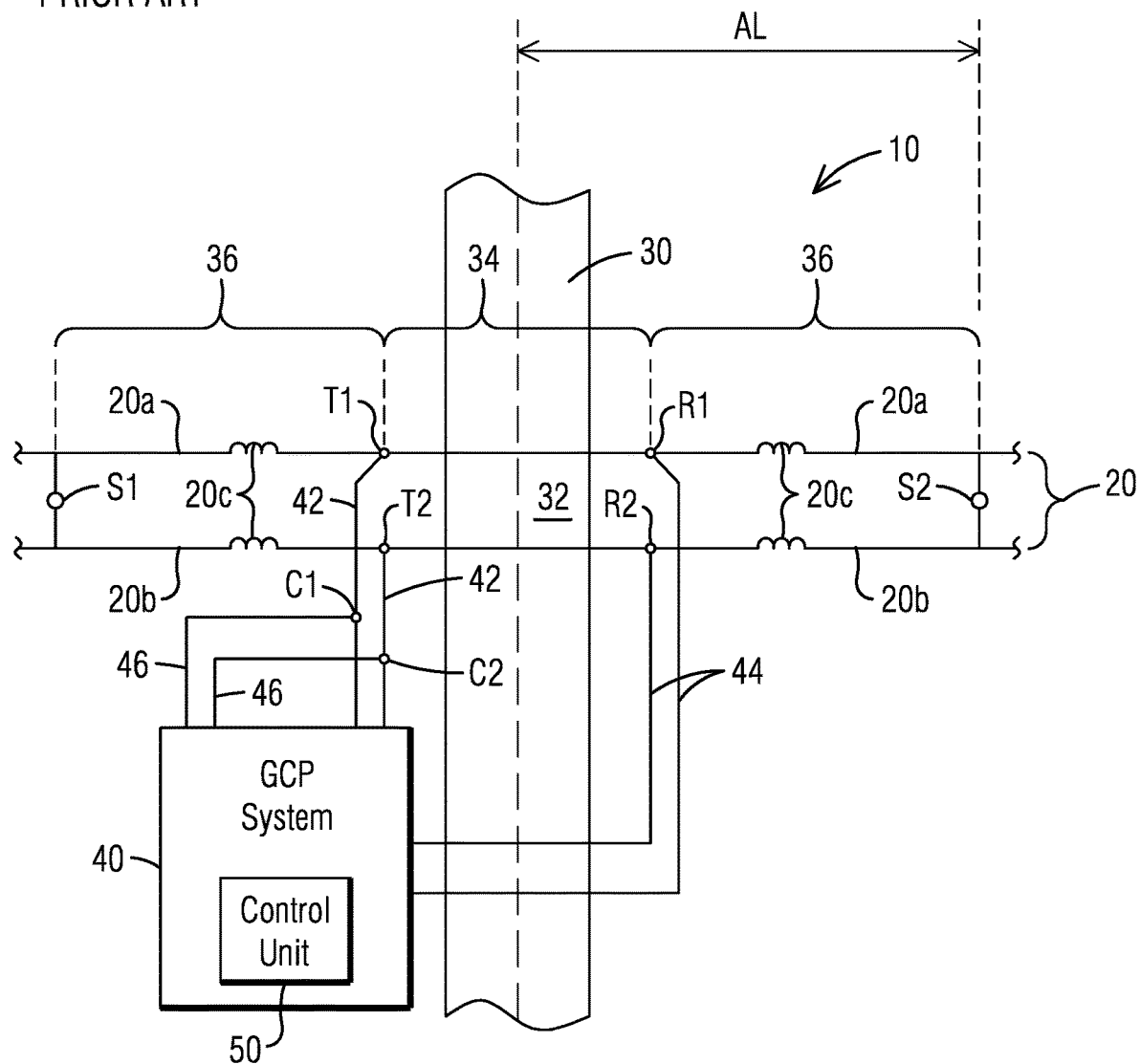
FIG. 1 illustrates an example railroad crossing control system in accordance with an embodiment disclosed herein.

FIG. 1 illustrates a known railroad crossing control system 10 in accordance with a disclosed embodiment, where a road 30 crosses a railroad track 20. The crossing of the road 30 and the railroad track 20 forms an island 32. The railroad track 20 includes two rails 20a, 20b and a plurality of ties (not shown in FIG. 1) that are provided over and within railroad ballast (not shown in FIG. 1) to support the rails 20a, 20b. The rails 20a, 20b are shown as including inductors 20c. The inductors 20c, however, are not separate physical devices but rather are shown to illustrate the inherent distributed inductance of the rails 20a, 20b.

The system 10 includes a constant warning time device 40, herein also referred to as grade crossing predictor (GCP) or GCP system, which comprises a transmitter that connects to the rails 20a, 20b at transmitter connection points T1, T2 on one side of the road 30 via transmitter wires 42. The constant warning time device 40 also comprises a main receiver that connects to the rails 20a, 20b at main receiver connection points R1, R2 on the other side of the road 30 via receiver wires 44. The receiver wires 44 are also referred to as main channel receiver wires. The constant warning time device 40 further comprises a check receiver that connects to the rails 20a, 20b at check receiver connection points C1, C2 via check channel receiver wires 46. The check channel receiver wires 46 are connected to the track 20 on the same side of the road 30 as the transmitter wires 42, resulting in a six-wire system. The main channel receiver and check channel receiver operate in much the same manner with an incoming train move, providing a parallel check of the main channel operation. Those of skill in the art will recognize that the transmitter and receivers (main channel receiver and check channel receiver), other than the physical conductors that connect to the track 20, are often co-located in an enclosure located on one side of the road 30.

The constant warning time device 40 includes a control unit 50 connected to the transmitter and receivers. The control unit 50 includes logic, which may be implemented in hardware, software, or a combination thereof, for calculating train speed, distance and direction, and producing constant warning time signals for the railroad crossing system 10. The control unit 50 can be for example integrated into a central processing unit (CPU) module of the GCP system 40 or can be separate unit within the GCP system 40 embodied as a processing unit such as for example a microprocessor.

Also shown in FIG. 1 is a pair of termination shunts S1, S2, one on each side of the road 30 at a desired distance from the center of the island 32. It should be appreciated that FIG. 1 is not drawn to scale and that both shunts S1, S2 are approximately the same distance away from the center of the island 32. The termination shunts S1, S2 are arranged at predetermined positions corresponding to an approach length AL required for a specific warning time (WT) for the GCP system 40. For example, if a total WT of 35 seconds (which includes 30 seconds of WT and 5 seconds of reaction time of the GCP system 40) at 60 mph maximum authorized speed (MAS) of a train is required, the calculated approach length AL is 3080 feet. Thus, the shunts S1, S2 are arranged each at 3080 feet from the center of the island 32. It should be noted that one of ordinary skill in the art is familiar with calculating the approach length AL. The termination shunts S1, S2 can be embodied for example as narrow band shunts (NBS).

FIG. 1 further illustrates an island circuit 34 which is the area between transmitter connection points T1, T2 and main receiver connection points R1, R2. For example, the constant warning time device 40 monitors the island circuit 34 as well as approach circuits 36 which lie to the right and left of the island circuit 34, i.e., between the island circuit 34 and the termination shunts S1, S2.

Typically, the shunts S1, S2 positioned on both sides of the road 30 and the associated constant warning time device 40 are tuned to the same frequency. This way, the transmitter can continuously transmit one AC signal having one frequency, the receiver can measure the voltage response of the rails 20a, 20b and the control unit 50 can make impedance and constant warning time determinations based on the one specific frequency. When a train crosses one of the termination shunts S1, S2, the train's wheels and axles act as shunts, which lower the inductance, impedance and voltage measured by the corresponding control unit 50. Measuring the change in the impedance indicates the distance of the train, and measuring the rate of change of the impedance (or integrating the impedance over time) allows the speed of the train to be determined.

Figure 2:
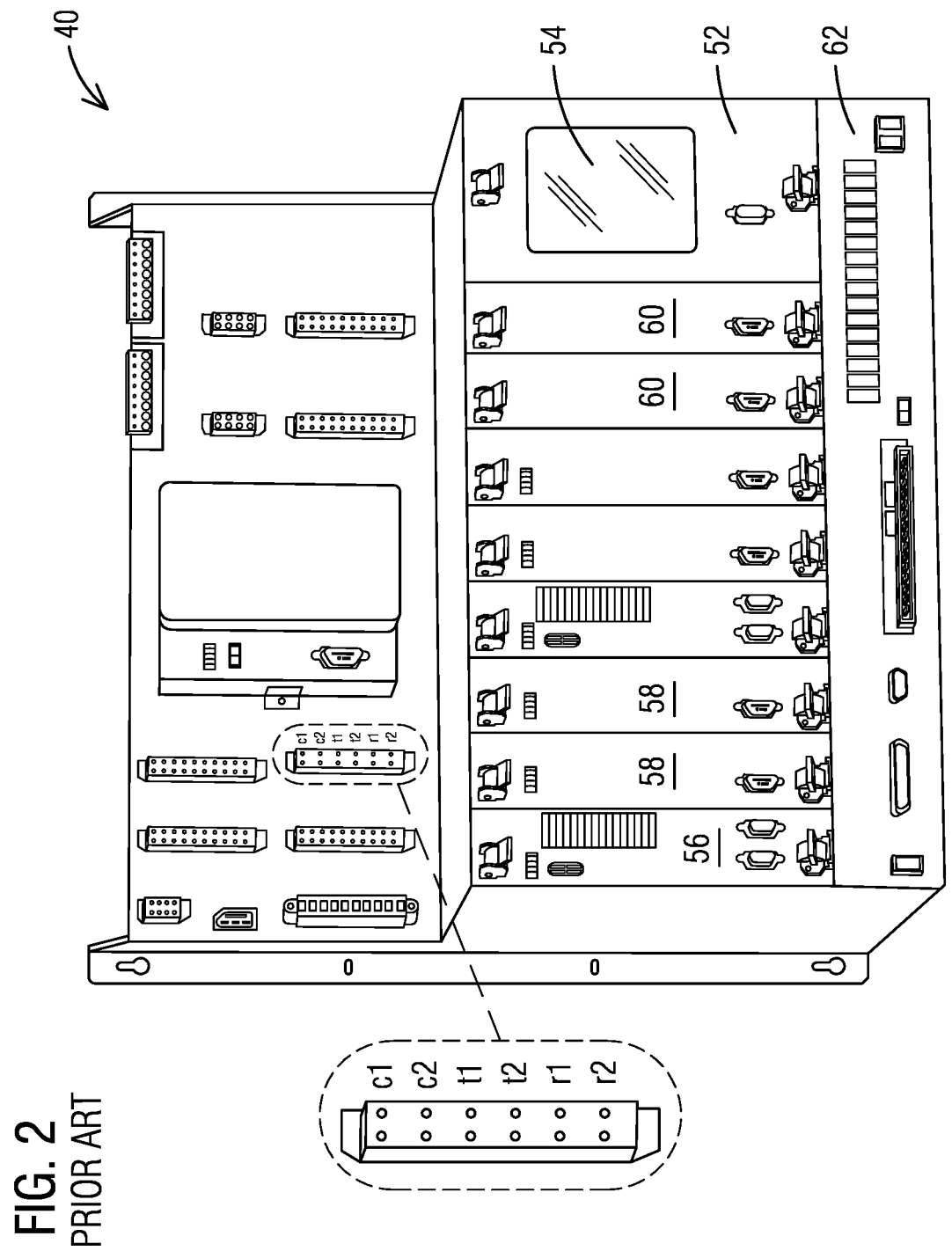
FIG. 2 illustrates an example constant warning time device in accordance with an embodiment disclosed herein.

FIG. 2 illustrates an example constant warning time device (GCP) 40 in accordance with an embodiment disclosed herein. The GCP 40, also referred to as GCP system or controller, is typically enclosed within a generally weatherproof bungalow or housing and usually in general proximity to at least one of the railroad tracks 20.

With reference to FIG. 2, the GCP system 40 is an integrated system that includes all of the control, train detection, recording and monitoring functions for the railroad crossing control system 10 shown in FIG. 1. The GCP system 40 includes a plurality of modules. One of these modules is a display module 52 with a display 54. Display 54 can be a touch screen display that provides a user interface, for example for initial setup, calibration and troubleshooting of the GCP system 40. Other modules may include a central processing unit (CPU) 56, track modules 58 for monitoring each track, crossing control modules 60 for controlling traffic warning gates, and a recorder module 62 for recording events and conditions at the railroad track system 10. Each of the modules may have external connectors, test points and lighted indicators. For example, each track module 58 comprises transmitter connection pins t1, t2, main receiver connection pins r1, r2, and check receiver connection pins c1, c2.

Figure 3:
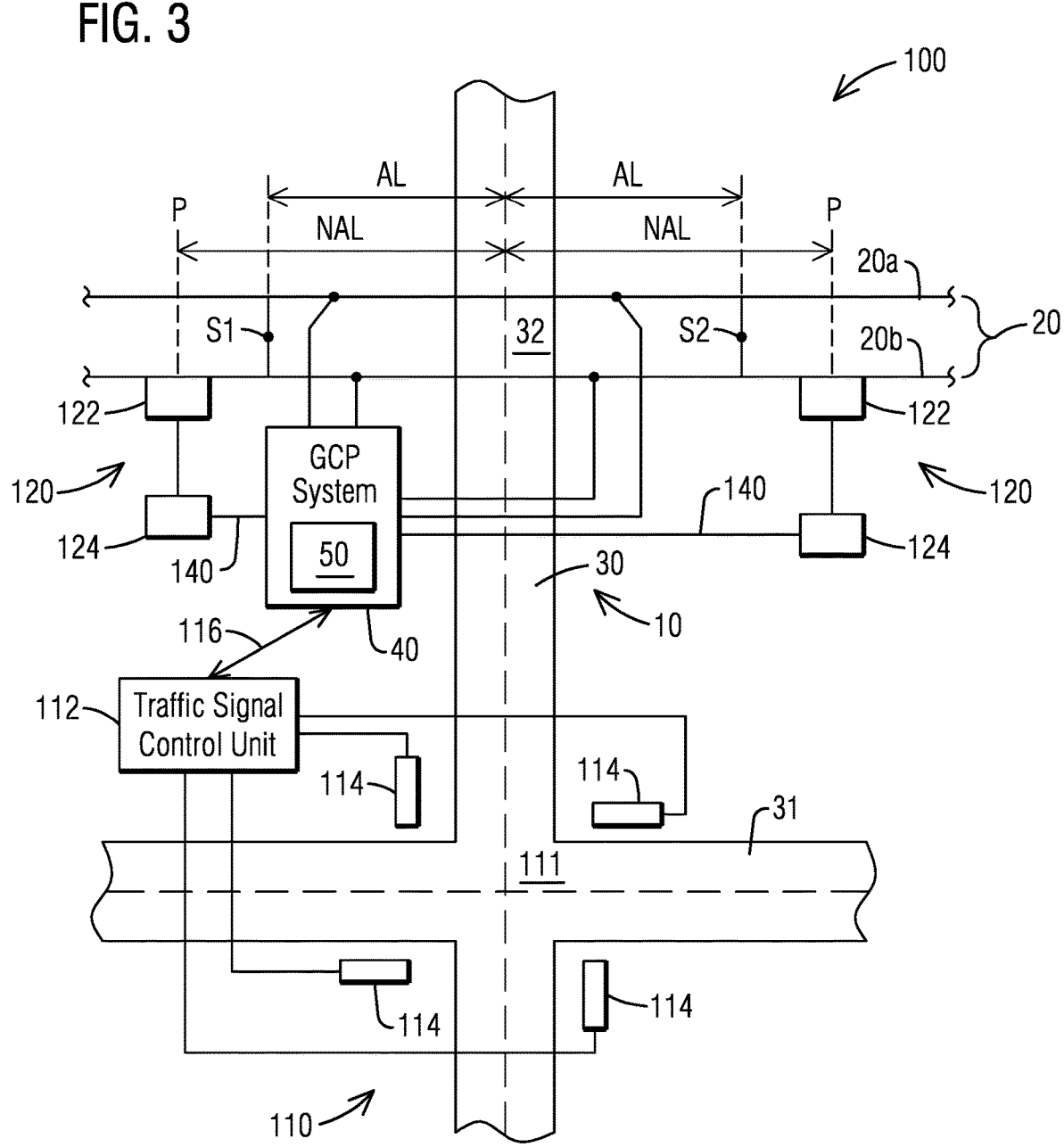
FIG. 3 illustrates a traffic control system in accordance with an exemplary embodiment of the present invention.

FIG. 3 illustrates a traffic control system 100 in accordance with an exemplary embodiment of the present invention. The traffic control system 100 includes a railroad crossing control system 10 as described before with reference to FIG. 1. Thus, with regard to the control system 10, it is referred to the description in connection with FIG. 1.

Further, FIG. 3 illustrates a traffic signal control system 110 in combination with a signalized road intersection 111, where roads 30 and 31 intersect. The traffic signal control system 110 comprises a traffic signal control unit 112 and a plurality of traffic signals 114. The control unit 112 and the traffic signals 114 are interconnected, wherein the control unit 112 controls operation of the traffic signals 114.

As described before, where a signalized road intersection 111 exists in close proximity to a railroad crossing, as shown for example in FIG. 3, the railroad crossing control system 10 and the traffic signal control system 110 are interconnected via a communication network 116 (which can be wired or wireless), and normal operation of the traffic signals 114 controlling the intersection is pre-empted to operate in a special control mode when rail vehicles are approaching on the track 20. A preemption sequence compatible with the railroad crossing control system 10 is extremely important to provide safe vehicular and pedestrian movements. For example, the GCP system 40 of the railroad crossing control system 10 provides both constant warning time signals for controlling crossing warning devices arranged in proximity to the railroad crossing (island 32) as well as preemption signals to the traffic signal control system 110, specifically to the traffic signal control unit 112. Preemption signals as used within this specification are signals that are fed, transmitted, forwarded and/or provided to the traffic signal control unit 112 by the GCP system 40, specifically by the control unit 50 of the GCP system 40, to initiate a preemption sequence by the traffic signal control unit 112. In other words, preemption signal are "request to turn red"-signals provided to the traffic signal control unit 112 by the GCP system 40. A preemption sequence or preemption mode refers to a special control mode of the traffic signals 114 when rail vehicles are approaching on the track 20. The traffic signal control unit 112 initiates and executes a preemption sequence when a preemption signal is received.

Since the railroad crossing control system 10 and the traffic signal control system 110 are interconnected, the warning time (WT) and consequently the approach length AL for the GCP system 40 and the traffic signal control system 110 increases for the preemption. In addition, as described before, FRA and DOT are requesting longer preemption warning times to turn traffic lights to red earlier. Longer preemption warning times require an even longer approach length AL to accommodate the long combined warning times needed for the preemption plus the regular warning time of the GCP system 40 for generating the constant warning time signals for controlling the crossing warning devices (prime crossing starts).

For example, the authorities, e.g. FRA and DOT, may request 45 seconds of preemption differential. In our example, where we calculated an approach length AL of 3080 feet for a WT of 35 seconds, the preemption differential of 45 seconds adds to the 35 seconds of WT. The new approach length NAL for combined 80 seconds is now 7040 feet (instead of 3080 feet). This means that the shunts S1, S2 now would have to be arranged at a distance of 7040 feet from the island 32 of the railroad crossing. As described before, the shunts S1, S2 and the associated constant warning time device 40 are tuned to the same frequency. But there are very few frequencies available that will reach for example 7040 feet electrically, when a combined WT of 80 seconds is required. For example, in a system that has 2 Ohms/1000 feet distributed ballast resistance, there is no frequency available that will reach 7040 feet electrically. If there are no frequencies available that can reach the required distance, a possible solution is to section the track 20 with insulated joints and install remote crossing equipment beyond the sectioning joints that communicates with the local crossing equipment. Further, equipment for block signal systems to accommodate the sectioning joints would be necessary. Longer requested preemption times may even require multiple sets of sectioning joints located on both sides of the interconnected crossings. But this described solution requires additional expensive equipment, installation and maintenance.

In accordance with an embodiment of the present invention, the traffic control system 100 further comprises a wheel sensing system 120. The wheel sensing system 120 comprises at least one sensor 122 and a trackside connection box 124 to provide data or information, such as for example vital speed values and/or direction values, of a rail vehicle travelling on the railroad track 20. It should be noted that the wheel sensing system 120 can comprise more than the at least one sensor 122, for example two sensors 122 which are substantially identical.

The at least one sensor 122 is arranged at the railroad track 20 at a predetermined position P and is physically connected to one of the rails 20a, 20b of the track 20. According to the example of FIG. 3, the sensor 122 is physically connected to the rail 20b, but the sensor 122 may alternatively be connected to the rail 20a. The sensor 122 senses the presence and movement of the metallic wheels of railcars of a railroad vehicle travelling on the track 20. But the sensor 122 does not have an electrical connection to the rail 20b (or 20a) or the track structure 20. In case of more than one sensor 122, the multiple sensors 122 would be arranged in series and next to each other and physically connected to one of the rails 20a, 20b. The wheel sensing system 120 will be described in more detail with reference to FIG. 4.

At least one sensor 122 is arranged on each side of the road 30 at a predetermined distance from the center of the island 32. In particular, the at least one sensor 122 is placed at a distance needed for the preemption for a train moving at maximum authorized speed (MAS). According to our previous example, which has a combined WT of 80 seconds and the new approach length NAL of 7040 feet, the at least one sensor 122 is arranged at a position of 7040 feet from the center of the island 32 as indicated by the new approach length NAL. The shunts S1, S2 remain at their original position at 3080 feet from the center of the island 32.

A communication network 140 interfaces with the constant warning time device 40 and the wheel sensing system 120, and is adapted to transmit data between the wheel sensing system 120 and the constant warning time device 40. Specifically, the trackside connection box 124 of the wheel sensing system 120 feeds data into the constant warning time device 40 via the communication network 140. The at least one sensor 122 measures or obtains speed values and/or direction values of a rail vehicle when the rail vehicle passes the at least one sensor 122 connected to one of the rails 20a, 20b. The trackside connection box 124 receives and records the speed and/or direction data and provides these data to the GCP system 40.

According to an exemplary embodiment, the communication network 140 is a network comprising one or more Ethernet protocols. In this case, the data or information provided by the wheel sensing system 120 is transmitted via the communication network 140 using one or more Ethernet protocols to the GCP system 40. Both the wheel sensing system 120 and the GCP system 40 support at least one common protocol over Ethernet, for example comprise integrated interfaces and/or modules that allow communication via Ethernet. In another example, a package that comprises an interface unit for communicating via Ethernet is provided and can be plugged directly into the GCP system and/or the wheel sensing system 120.

In an alternative embodiment, the communication network 140 can comprise a radio data system for transmitting the data/information of the wheel sensing system 120 to the GCP system 40 using one or more suitable radio frequencies, wherein the wheel sensing system 120 and the GCP system 40 comprise corresponding radio receiving/transmitting equipment. In a further alternative embodiment, the communication network 140 may be a network such as for example the Internet or local area networks. The communication network 140 can be a wireless or a wired network.

The wheel sensing system 120 is installed to provide in particular vital speed values of a rail vehicle which are in turn used for providing the preemption signal to the road traffic signal control unit 112 for initiating a preemption sequence. As noted before, the constant warning time device 40 and the road traffic signal control unit 112 are interconnected via the communication network 116 for preemption purposes. In our example, the data of the wheel sensing system 120 are primarily used for producing the preemption signals, wherein the shunts S1, S2 are used for creating the constant warning time signals. However, the data, i.e. speed values, of the wheel sensing system 120 can also be used by the GCP system 40 for producing constant warning time signals.

As noted before, the control unit 50 can be part of the CPU module 56 (see FIG. 2) of the GCP system 40. The control unit 50 and/or the CPU module 56 comprises prediction logic, which may be implemented in hardware, software, or a combination thereof, for calculating train speed, distance and direction, and producing constant warning time signals for the railroad crossing system 10. The data, in particular the speed values, of the wheel sensing system 120 are fed into the prediction logic built into the GCP system 40. Based on the data fed into the prediction logic, the GCP system 40 produces multiple signals, for the example the preemption signal for the traffic signal control unit 112.

The wheel sensing system 120 has no direct electrical connection to the rails 20a, 20b of the track 20 and provides speed and/or direction information to the local GCP system 40 to allow the GCP system 40 to make a prediction decision for the preemption of the traffic signal control system 110. Because the wheel sensing system 120 is electrically isolated from the rail track 20, the need for lower crossing approach frequencies and longer crossing approaches are eliminated. Providing a link between the wheel sensing system 120 and the GCP system 40 minimizes the extra equipment that would be needed to provide the longer crossing approaches.

Figure 4:
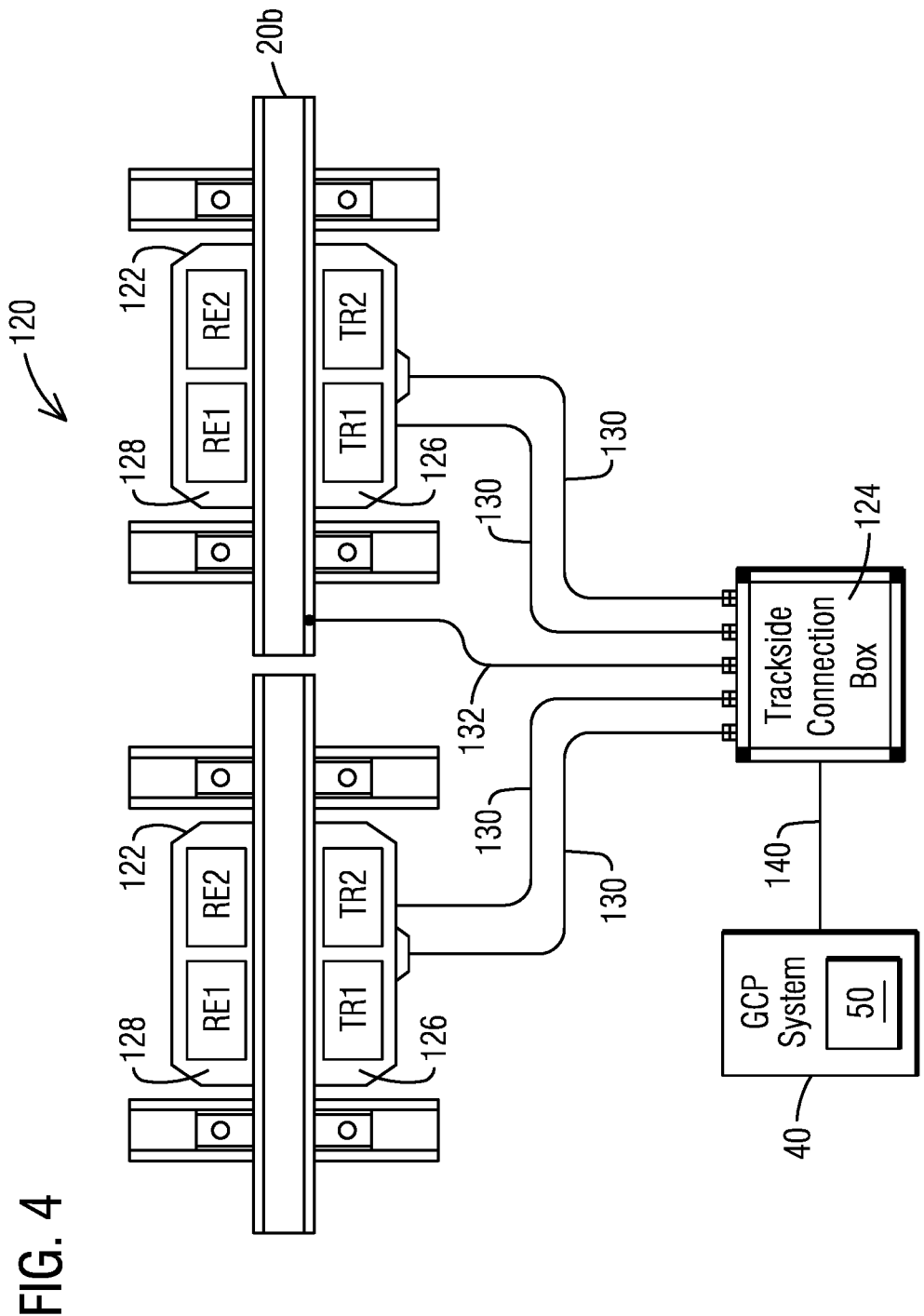
FIG. 4 illustrates a wheel sensor system for a traffic control system in accordance with an exemplary embodiment of the present invention.

FIG. 4 illustrates a wheel sensing system 120 for a traffic control system in accordance with an exemplary embodiment of the present invention. The wheel sensing system 120 determines the actual speed of rail vehicles. As described before, the wheel sensing system 120 comprises one or more sensors 122 and the trackside connection box 124. The embodiment as described in FIG. 4 includes two sensors 122 and the trackside connection box 124, wherein the two sensors 122 are identical.

Each sensor 122 comprises two electronic sensing units, wherein each sensing unit comprises a transmitter TR1, TR2 and a receiver RE1, RE2. Both transmitters TR1, TR2 are accommodated in a transmitter housing 126, and both receivers RE1, RE2 are accommodated in a receiver housing 128. The transmitter housing 126 including the transmitters TR1, TR2 and the receiver housing 128 including the receivers RE1, RE2 are physically coupled to one of the rails 20a, 20b (in this example rail 20b), wherein the transmitter housing 126 and the receiver housing 128 are positioned on opposite sides of the rail 20b, so that a receiver RE1, RE2 is positioned opposite a transmitter TR1, TR2. The housings 126, 128 including transmitters TR1, TR2 and receivers RE1, RE2 are detachably coupled to the rail 20b via bolts or screws, in particular to a rail web of the rail 20b.

Each sensor 122 operates based on electromagnetic wheel detection. The transmitters TR1, TR2 produce alternating magnetic fields of a specific frequency. The receivers RE1, RE2 comprise for example solenoids or coils, wherein the magnetic fields generated by the transmitters TR1, TR2 induce voltages in the receivers RE1, RE2. Based on the induced voltages, the receivers RE1, RE2 provide signals. When a metallic wheel of a rail vehicle enters the alternating magnetic fields, intensities of the magnetic fields change and consequently the induced voltages and the signals based on the induced voltage in the receivers RE1, RE2 change. The signals of the receivers RE1, RE2 are transmitted to the trackside connection box 124. The receivers RE1, RE2 and the transmitters TR1, TR2 are operably coupled to the trackside connection box 124 via connections 130, for example cables. The system further comprises ground cable 132 directly coupled to the rail 20b. Based on the signals of the receivers RE1, RE2 in combination with a defined distance between the transmitters TR1, TR2 and receivers RE1, RE2 and time difference when the wheels of a rail vehicle pass the transmitters TR1, TR2 and receivers RE1, RE2, the trackside connection box 124 determines the actual speed of the rail vehicle. As described before, the trackside connection box 124 is operably coupled to the GCP system 40, wherein the GCP system 40 uses the speed signals for producing and providing signals, such as for example a preemption signal, for the traffic signal control unit 112.

Figure 5:
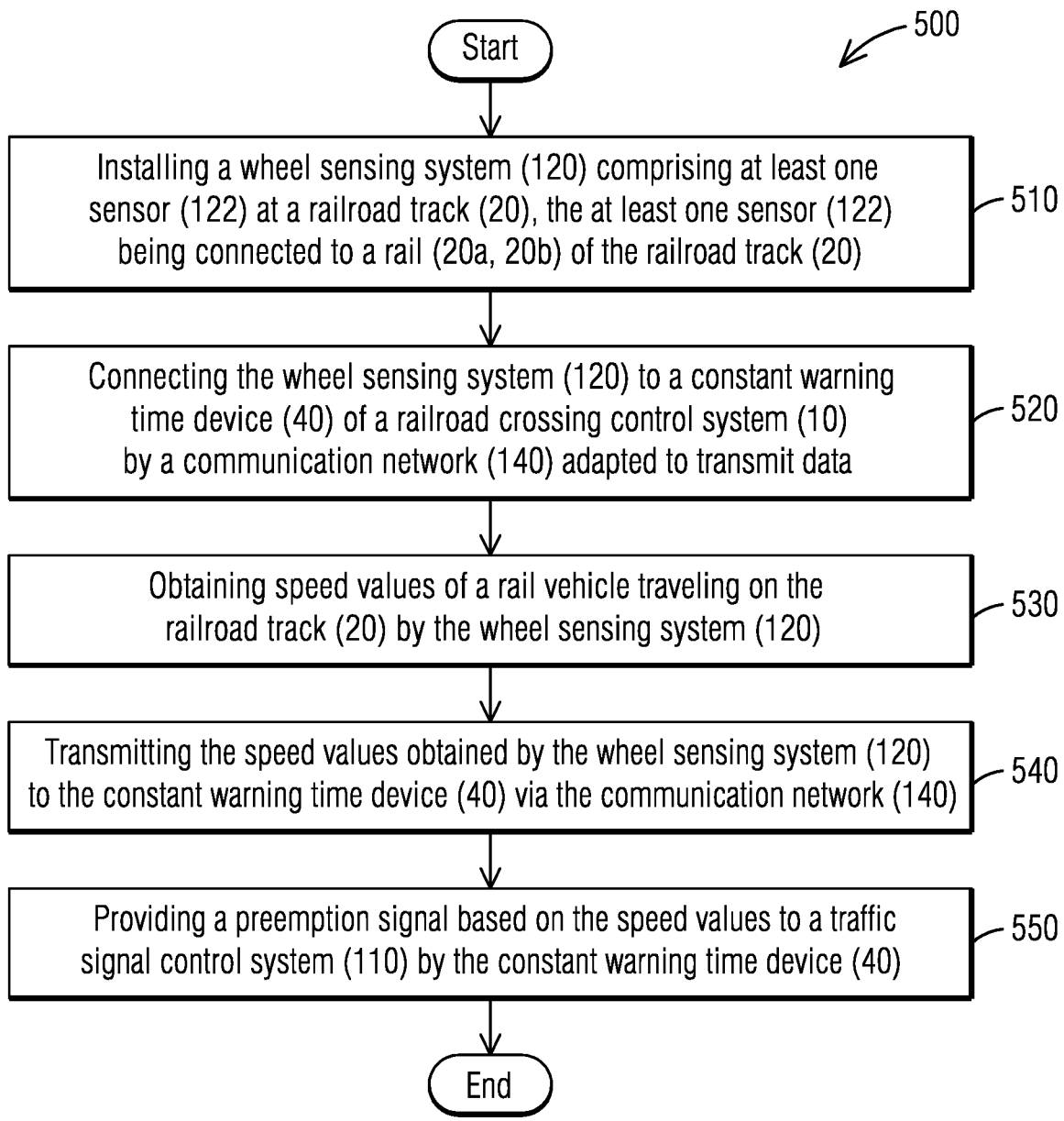
FIG. 5 illustrates a flow chart of a method for providing a preemption signal to a traffic signal control system in accordance with an exemplary embodiment of the present invention.

FIG. 5 illustrates a flow chart of a method 500 for providing a preemption signal to a traffic signal control system in accordance with an exemplary embodiment of the present invention. The method 500 refers to components and elements of the traffic control system 100 as described with reference to FIGS. 3 and 4. In step 510, a wheel sensing system 120 comprising at least one sensor 122 is installed at a railroad track 20, wherein the at least one sensor 122 is physically, but not electrically, connected to one of the rails 20a, 20b of the railroad track 20 (see FIG. 3). The wheel sensing system 120, in particular a trackside connection box 124 of the system 120, is connected to a constant warning time device 40 of a railroad crossing control system 10 by a communication network 140 adapted to transmit data (step 520). The method 500 further comprises obtaining speed values of a rail vehicle travelling on the railroad track 20 by the wheel sensing system 120 (step 530). In step 540, the speed values obtained by the wheel sensing system 120 are transmitted to the constant warning time device 40 via the communication network 140, wherein a preemption signal is provided based on the speed values to a traffic signal control system 110 by the constant warning time device 40 (step 550). It should be appreciated that the described method 500 can comprise more or steps, or some steps can be repeated multiple times, or some steps are optional. For example, steps 510 and 520 may only be performed once, when the systems are initially installed, wherein steps 530, 540 and 550 can be repeated multiple times. It should be noted that further details of the described method 500 are also described in the description with reference to FIGS. 1-4.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. A traffic control system comprising:
   a railroad crossing control system comprising a constant warning time device with a control unit configured to produce multiple signals, and wherein the railroad crossing control system comprises a termination shunt arranged at a first predetermined position of a railroad track, the first predetermined position corresponding to a first approach length required for a first warning time for the constant warning time device,
   a wheel sensing system comprising at least one sensor connected to a rail of the railroad track at a second predetermined position, the second predetermined position corresponding to a second approach length required for a second warning time, wherein the second approach length and the second warning time are greater than the first approach length and the first warning time,
   a communication network interfacing with the railroad crossing control system and the wheel sensing system and adapted to transmit data, and
   a traffic control unit controlling a plurality of traffic signals of a signalized road intersection, the traffic control unit being operably coupled to the constant warning time device,
   wherein the wheel sensing system provides speed values of a rail vehicle travelling on the railroad track, and wherein the speed values are transmitted to the railroad crossing control system via the communication network for producing a preemption signal for the traffic control unit, and
   wherein the traffic control unit initiates a preemption sequence for the traffic signals based on the preemption signal.

2. The traffic control system of claim 1, wherein the control unit of the constant warning time device further comprises prediction logic for producing the preemption signal and constant warning time signals, and wherein the speed values of the at least one sensor are fed into the prediction logic.

3. The traffic control system of claim 1, wherein the second predetermined position of the at least one sensor corresponds to the second approach length required to start the preemption sequence, the second approach length being determined for the train vehicle travelling on the track at maximum authorized speed.

4. The traffic control system of claim 1, wherein the at least one sensor is physically connected to the rail of the railroad track without an electrical connection to the rail or the railroad track.

5. The traffic control system of claim 1, wherein the at least one sensor comprises transmitters and receivers, and the speed values of the rail vehicle are determined based on electromagnetic detection of wheels of the rail vehicle by the transmitters and receivers.

6. The traffic control system of claim 5, wherein the wheel sensing system further comprises a trackside connection box operably coupled to the at least one sensor, the trackside connection box determining the speed values of the rail vehicle and transmitting the speed values to the constant warning time device.

7. The traffic control system of claim 1, wherein the communication network comprises one or more Ethernet protocols, and wherein the speed values are transmitted using the one or more Ethernet protocols.

8. The traffic control system of claim 1, wherein the wheel sensing system comprises multiple sensors arranged in series and connected to a rail.

9. The traffic control system of claim 1, comprising multiple wheel sensing systems, wherein sensors of the multiple wheel sensing systems are connected to a rail of the railroad track at predetermined positions on opposite sides of an island of a railroad crossing.

10. A method for providing a preemption signal to a traffic signal control system comprising:
    installing a railroad crossing control system comprising a constant warning time device with a control unit configured to produce multiple signals, and installing a termination shunt at a first predetermined position of a railroad track, the first predetermined position corresponding to a first approach length required for a first warning time for the constant warning time device,
    installing a wheel sensing system comprising at least one sensor at the railroad track, the at least one sensor being connected to a rail of the railroad track, the at least one sensor being installed at a second predetermined position corresponding to a second approach length required for a second warning time, wherein the second approach length and the second warning time are greater than the first approach length and the first warning time,
    connecting the wheel sensing system to a constant warning time device of a railroad crossing control system by a communication network adapted to transmit data,
    obtaining speed values of a rail vehicle travelling on the railroad track by the wheel sensing system,
    transmitting the speed values obtained by the wheel sensing system to the constant warning time device via the communication network, and
    providing a preemption signal based on the speed values to a traffic control unit by the constant warning time device, the traffic control unit controlling a plurality of traffic signals of a signalized road intersection, and
    initiating a preemption sequence for the traffic signals based on the preemption signal.

11. The method of claim 10, wherein obtaining the speed values of the rail vehicle travelling on the railroad track comprises electromagnetically detecting wheels of the rail vehicle by the at least one sensor.

12. The method of claim 11, wherein the wheel sensing system further comprises a trackside connection box operably coupled to the at least one sensor, and wherein the trackside connection box determines the speed values of the rail vehicle based on the electromagnetic detection of the wheels of the rail vehicle by the at least one sensor.

13. The method of claim 12, wherein the speed values determined by the trackside connection box of the wheel sensing system are transmitted to the constant warning time device via the communication network using one or more Ethernet protocols.

* * * * *